US009102424B2

(12) United States Patent
Gynnild

(10) Patent No.: US 9,102,424 B2
(45) Date of Patent: Aug. 11, 2015

(54) JAW SUPPORT FOR A POUCH FILLER

(75) Inventor: Robert Lawrence Gynnild, Eau Claire, WI (US)

(73) Assignee: Nestec S.A., Vevey (CH)

( * ) Notice: Subject to any disclaimer, the term of this patent is extended or adjusted under 35 U.S.C. 154(b) by 303 days.

(21) Appl. No.: 13/256,998

(22) PCT Filed: Mar. 24, 2010

(86) PCT No.: PCT/US2010/028401
§ 371 (c)(1), (2), (4) Date: Jan. 25, 2012

(87) PCT Pub. No.: WO2010/111325
PCT Pub. Date: Sep. 30, 2010

(65) Prior Publication Data
US 2013/0119044 A1 May 16, 2013

Related U.S. Application Data

(60) Provisional application No. 61/163,594, filed on Mar. 26, 2009.

(51) Int. Cl.
*H05B 1/00* (2006.01)
*B65B 7/02* (2006.01)
(Continued)

(52) U.S. Cl.
CPC ... *B65B 7/02* (2013.01); *B23Q 3/18* (2013.01); *B29B 13/025* (2013.01); *B29C 65/18* (2013.01); *B29C 65/305* (2013.01); *B29C 65/743* (2013.01); *B29C 66/1122* (2013.01); *B29C 66/43* (2013.01); *B29C 66/4312* (2013.01); *B29C 66/53262* (2013.01); *B29C 66/8161* (2013.01); *B29C 66/8167* (2013.01); *B29C 66/81422* (2013.01); *B29C 66/81427* (2013.01); *B29C 66/81457* (2013.01);
(Continued)

(58) Field of Classification Search
CPC ............... B23Q 3/18; B65B 7/02; H05B 3/03
USPC .............. 219/134, 221, 385; 53/128.1, 133.1, 53/133.2, 133.3, 133.4, 396, 410, 412, 565
See application file for complete search history.

(56) References Cited

U.S. PATENT DOCUMENTS 4,695,337 A * 9/1987 Christine ......................... 156/69
5,131,213 A 7/1992 Shanklin et al.
(Continued)

FOREIGN PATENT DOCUMENTS

DE 74733 7/1970
DE 42 28 181 3/1994
(Continued)

OTHER PUBLICATIONS

English Language Translation of DE4228181.*
(Continued)

*Primary Examiner* — Dana Ross
*Assistant Examiner* — Joseph Iskra
(74) *Attorney, Agent, or Firm* — K&L Gates LLP

(57) ABSTRACT

A jaw support and a sealing jaw for form, fill and seal machines are provided. In alternative embodiments, the form, fill and seal machines may include a fitment applicator station, a fitment applicator, a fitment heater assembly and a sealing jaw constructed and arranged to form a container and transfer and apply a fitment to the container.

9 Claims, 13 Drawing Sheets

(51) Int. Cl.

| | | |
|---|---|---|
| *B29B 13/02* | (2006.01) | |
| *B29C 65/18* | (2006.01) | |
| *B29C 65/74* | (2006.01) | |
| *B29C 65/00* | (2006.01) | |
| *B65B 51/30* | (2006.01) | |
| *B65B 61/18* | (2006.01) | |
| *B23Q 3/18* | (2006.01) | |
| *H05B 3/03* | (2006.01) | |
| *B29C 65/30* | (2006.01) | |

(52) U.S. Cl.
CPC .......... *B29C 66/8322* (2013.01); *B29C 66/849* (2013.01); *B29C 66/91212* (2013.01); *B29C 66/91231* (2013.01); *B29C 66/91421* (2013.01); *B65B 51/303* (2013.01); *B65B 61/186* (2013.01); *H05B 3/03* (2013.01); *B29C 66/81417* (2013.01); *B29K 2821/00* (2013.01); *B31B 2201/9085* (2013.01)

(56) References Cited

U.S. PATENT DOCUMENTS

| | | | |
|---|---|---|---|
| 5,759,319 | A | 6/1998 | Moody et al. |
| 6,045,006 | A | 4/2000 | Frazier et al. |
| 6,527,688 | B1 | 3/2003 | Kucera et al. |
| 7,174,699 | B1 | 2/2007 | Wyman et al. |
| 2002/0116902 | A1 | 8/2002 | Skinner et al. |
| 2007/0034329 | A1 | 2/2007 | Padoy |

FOREIGN PATENT DOCUMENTS

| | | |
|---|---|---|
| FR | 2414393 | 8/1979 |
| FR | 2860179 | 4/2005 |
| GB | 1465944 | 3/1977 |
| JP | 03-240631 | 10/1991 |
| JP | 04-007132 | 1/1992 |
| JP | 06-46925 | 6/1994 |
| JP | 06-227519 | 8/1994 |
| JP | 2000-053110 | 2/2000 |
| JP | 2002-516794 | 6/2002 |
| JP | 3105341 U | 9/2004 |
| JP | 2006-053547 | 3/2005 |
| JP | 2005-225507 | 8/2005 |
| JP | 2006-298390 | 11/2006 |
| WO | 2007/065951 | 6/2007 |
| WO | 2008/058389 | 5/2008 |

OTHER PUBLICATIONS

International Search Report for International Application No. PCT/US2010/028401 mailed on Aug. 13, 2010.
Written Opinion for International Application No. PCT/US2010/028401 mailed on Aug. 13, 2010.
International Preliminary Report on Patentability for International Application No. PCT/US2010/028401 mailed Oct. 6, 2011.

* cited by examiner

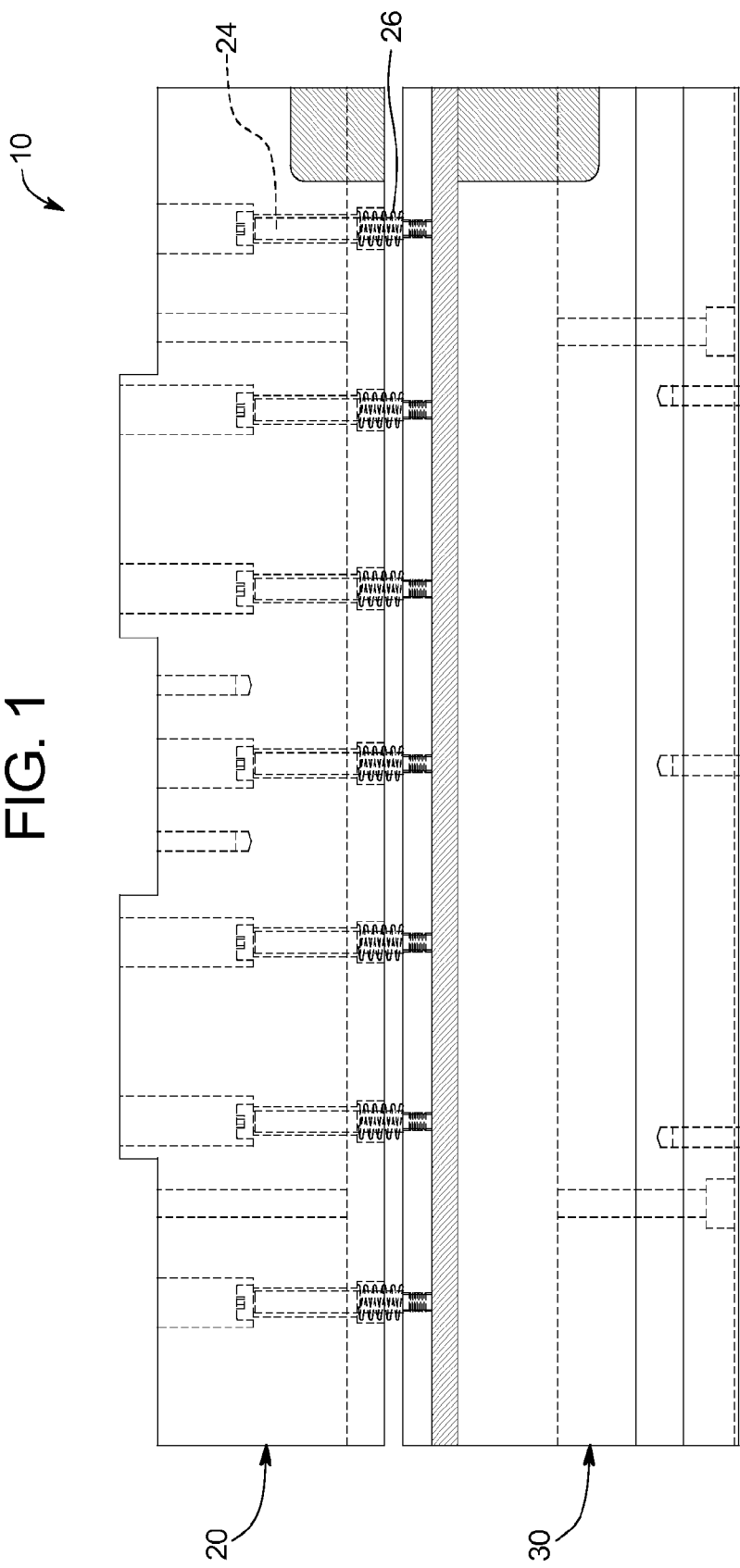

JAW SUPPORT FOR A POUCH FILLER

CROSS REFERENCE TO RELATED APPLICATIONS

The present application is a National Stage of International Application No. PCT/US2010/028401, filed on Mar. 24, 2010, which claims priority to U.S. Patent Application Ser. No. 61/163,594, filed on Mar. 26, 2009, the entire contents of which are being incorporated herein by reference.

BACKGROUND

The present disclosure relates generally to form, fill and seal machines. More specifically, the present disclosure relates to improvements to the form, fill and seal machines.

Form, fill and seal machines are commonly known in the packaging industry. Form, fill and seal machines are generally made of numerous components that perform separate steps of forming, filling and sealing containers with a suitable product such as a food or medical product. Typically, the machine transforms a roll of film into a flexible container. The machine fills the flexible container with the food or medical product and seals the container. The machine can further attach a fitment to the flexible container. Nevertheless, conventional form, fill and seal machines contain a number of components that are unstable, wear down easily causing increased down time for repairs and/or are not optimal in terms of speed, efficiency or energy use.

SUMMARY

The present disclosure is directed to form, fill and seal machines and the individual components that comprise the form, fill and seal machines. In a general embodiment, the present disclosure provides a fitment applicator station, a fitment applicator, a fitment heater assembly and a sealing jaw constructed and arranged to form a container and transfer and apply a fitment to the container.

In an embodiment, the present disclosure provides a jaw support comprising a jaw housing. At least one bolt, a spring attached to the bolt and a seal attached to the spring are contained by the jaw housing. The jaw support further includes a compression element such as a back-up rubber. In an embodiment, the back-up rubber has a crown shape having a pointed side.

In another embodiment, the present disclosure provides a jaw support comprising a jaw housing and an upper series of two or more bolts, a spring attached to each of the bolts and a seal attached to the each of the springs and contained by the jaw housing. The jaw support includes a middle series of back-up rubbers attached to the jaw housing. In addition, the jaw support further includes a lower series of two or more bolts, a spring attached to each of the bolts and a seal attached to the each of the springs and contained by the jaw housing.

In an alternative embodiment, the present disclosure provides a sealing jaw comprising i) a first jaw support comprising a first jaw housing, at least one bolt, a spring attached to the bolt and a seal attached to the spring contained by the first jaw housing, and a back-up rubber attached to the second jaw housing, and ii) a second jaw support comprising a second jaw housing and a heating element attached to the second jaw housing.

In yet another embodiment, the present disclosure provides a fitment heater assembly comprising a fitment heater block, at least one temperature probe, and a clamp constructed and arranged to secure the temperature probe. The temperature probe can be contained with a temperature probe housing. The fitment heater block can further include at least one heating cartridge. In an embodiment, the fitment heat block comprises an extended portion having the shape of a bulls-eye.

In another embodiment, the present disclosure provides a fitment applicator station comprising an applicator plate having at least one bushing, an applicator spacer block attached to the applicator plate, and a fitment applicator attached to the applicator spacer block.

In still another embodiment, the present disclosure provides a fitment applicator comprising an applicator head plate, an applicator head attached to the applicator head plate, and an applicator head cap attached to the applicator head. A vacuum tube can be attached to the applicator head plate. A fiber optic device can be attached to the applicator head.

In an alternative embodiment, the present disclosure provides a method of sealing films. In this embodiment, the method comprises providing a sealing jaw comprising i) a first jaw support comprising a first jaw housing, at least one bolt, a spring attached to the bolt and a seal attached to the spring contained by the first jaw housing, and a back-up rubber attached to the second jaw housing, and ii) a second jaw support comprising a second jaw housing and a heating element attached to the second jaw housing. At least two films are inserted between the first jaw support and the second jaw support. The first jaw support is pressed against the second jaw support to form a seal between the two films. The second jaw support is sufficiently heated by the heating element to weld the two films together to form a seam or seal.

In yet another embodiment, the present disclosure provides a method of applying a fitment to a film. The method comprises providing a fitment applicator station comprising an applicator plate having at least one bushing, an applicator spacer block attached to the applicator plate, and a fitment applicator attached to the applicator spacer block, the fitment applicator having a fitment. The method further comprises providing a fitment heater assembly comprising a fitment heater block, at least one temperature probe, and a clamp constructed and arranged to secure the temperature probe. A film is placed between the fitment applicator station and the fitment heater assembly. The fitment is pressed into the film and the fitment heater block by the fitment applicator. The fitment heater block is heated so that the fitment because fixedly attached to the film.

An advantage of the present disclosure is to provide an improved apparatus for forming, filling and sealing containers.

Another advantage of the present disclosure is to provide an improved apparatus for sealing the edges (e.g., horizontal) of a container.

Yet another advantage of the present disclosure is to provide an improved apparatus for placing a fitment onto a container.

Still another advantage of the present disclosure is to provide an improved apparatus for transporting a fitment from a storage location to a fitment applicator station.

Another advantage of the present disclosure is to provide an improved apparatus for loading a fitment onto a fitment indexer.

Additional features and advantages are described herein, and will be apparent from the following Detailed Description and the figures.

BRIEF DESCRIPTION OF THE FIGURES

FIG. 1 illustrates a top view of a sealing jaw in an embodiment of the present disclosure.

DETAILED DESCRIPTION

Figure 2A:
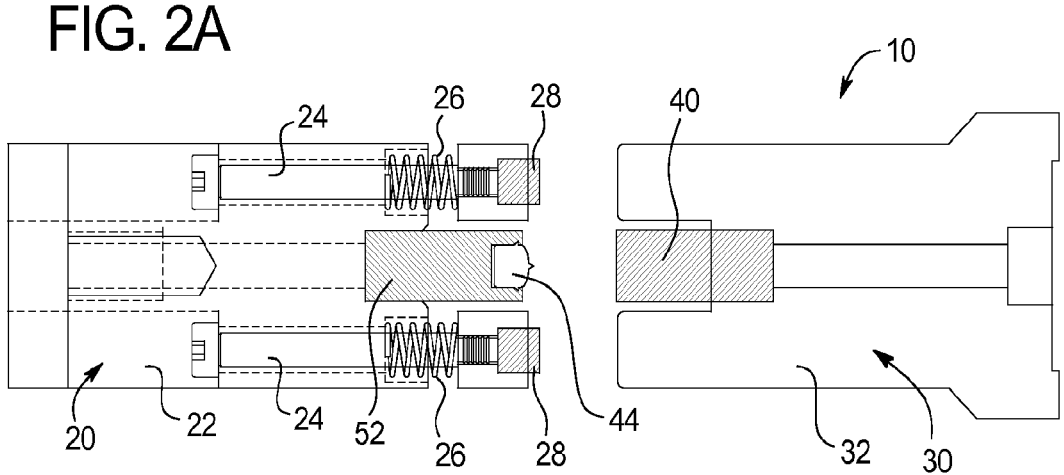
FIGS. 2A-2C illustrate side views of a sealing jaw in different positions in an embodiment of the present disclosure.

The present disclosure is directed to form, fill and seal machines and the individual components that make up the form, fill and seal machines. In alternative embodiments, the form, fill and seal machines may include a fitment applicator station, a fitment applicator, a fitment heater assembly and a sealing jaw constructed and arranged to transfer and apply a fitment to a container. The individual components of the form, fill and seal machines described herein are simplified and streamlined over convention form, fill and seal machines to provide a positive transfer of fitments from a vibratory track to being applied to a plastic film that forms a pouch. This provides better reliability and quality seal of the fitment to the pouch.

Referring now to the drawings and in particular to FIGS. 1 and 2A-2C, a sealing jaw 10 in an embodiment of the present disclosure is illustrated. Sealing jaw 10 includes a first jaw support 20 and a second jaw support 30. First jaw support 20 and second jaw support are constructed and arranged to move toward and away from each other during operation. First jaw support 20 and second jaw support 30 can be used to form a side seam (e.g., seal) on a pouch or bag. Sealing jaw 10 is capable of creating a sufficiently thick sealing surface and has limited movement when pressed together (e.g., self aligning), which creates more consistent straight line or horizontal seals.

Figure 2B:
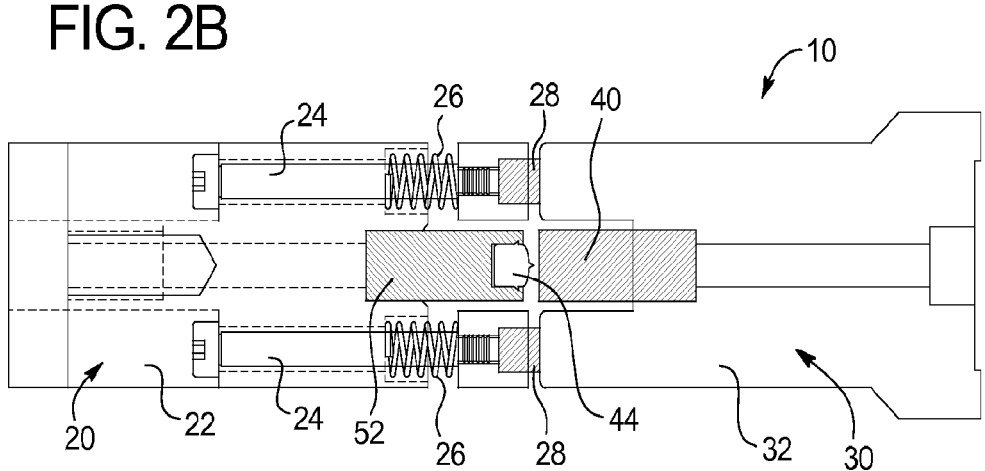
Figure 2C:
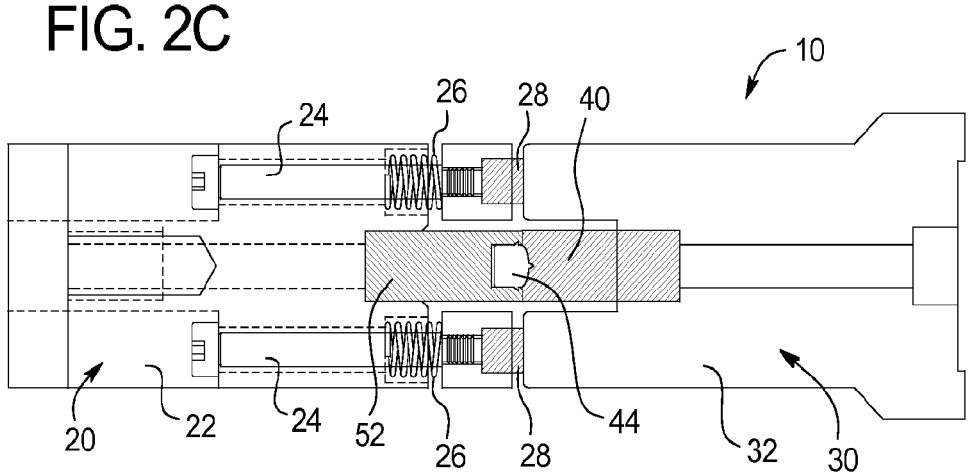

First jaw support 20 includes a first jaw housing 22 that contains one or more shoulder bolts 24 (e.g., an upper bolt and a lower bolt) with each shoulder bolt 24 attached to a spring 26. Each spring 26 is attached to seals 28. Seals 28 can be, for example, quad rings made from a silicon rubber. Seals 28 can run along the entire length of first jaw housing 22. As seen in FIGS. 2A-2C, first jaw support 20 moves toward second jaw support 30. This enables seals 28 positioned within first jaw housing 22 to contact an end of second jaw support 30. Seals 28 compress springs 26 so that seals 28 move back into first jaw housing 22. In this regard, a tight seal can be formed between seals 28 and the end of second jaw support 30.

First jaw housing 22 also contains a compression element 44 that is constructed and arranged at or near an end of first jaw housing 22. For example, compression element 44 can be positioned within a passage or holder 52 in first jaw housing 22. Compression element 44 can be any suitable material such as, for example, a rubber or other suitable polymeric material that is capable of being exposed to high heat without significantly distorting.

Figure 3:
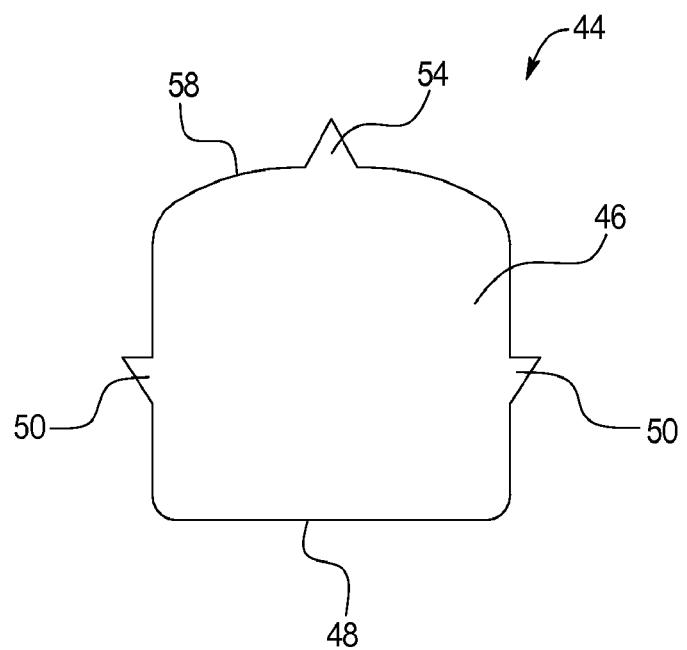
FIG. 3 illustrates a side view of a back-up rubber in an embodiment of the present disclosure.

In an embodiment illustrated in FIG. 3, compression element 44 is a back-up rubber that has a rounded crown shape portion 46 and a flat side 48. Compression element 44 further has one or more catches 50 so that it remains firmly within passage 52. Compression element 44 also contains a point or pointed edge 54 on an exposed surface or side 58 that is used to separate sheets of film to produce edges of a pouch or container.

Second jaw support 30 includes a second jaw housing 32. Second jaw housing 22 also contains a heating element 40 to heat an end of second jaw housing 32 where heating element 40 is located. Heating element 40 can be manually or automatically controlled to heat the end of second jaw housing 32 to any suitable temperature.

Either one or both of the first jaw support 20 and second jaw support 30 can move toward each other to heat compress, for example, two or more sheets of film together to form a seam (e.g., seal) with sheets of film placed between first jaw support 20 and second jaw support 30. The seam can form the side edges of the container formed by the film and be sufficiently strong to retain liquid with the container. In an alternative embodiment, one jaw support can move while the opposing jaw support remains stationary.

In an operational embodiment, two sheets of separated film are placed between first jaw support 20 and second jaw support 30. First jaw support 20 and second jaw support 30 move toward each other thereby compressing the sheets of film between seals 28 and the end of second jaw support 30. Upper and lower seals 28 pressing against second jaw housing 32 hold the sheets of film of the pouch or bag in the desired position while compression element 44 presses the sheets of film into heating element 40. More specifically, as the pressure causes seals 28 to compress springs 26 against bolts 24, compression element 44 contacts the sheets of film and presses the sheets against heating element 40 of second jaw housing 32. Heating element 40 is sufficiently heated to cause the two sheets of film to be permanently or releasably attached to each other at the newly formed seam.

It should be noted that exposed side 58 of compression element 44 is the surface that contacts the sheets of film and pushes the sheets of film into heating element 40. In this regard, exposed side 58 assists in generating seal seams that are approximately straight along the edges of the sealed films. The width of compression element 44 from its edge to pointed edge 54 can represent the thickness of the seam formed on the edge of the film and can be any suitable width. Point edge 54 of compression element 44 assists in cutting the sheets of film to form separated container edges having seams.

Figure 6:
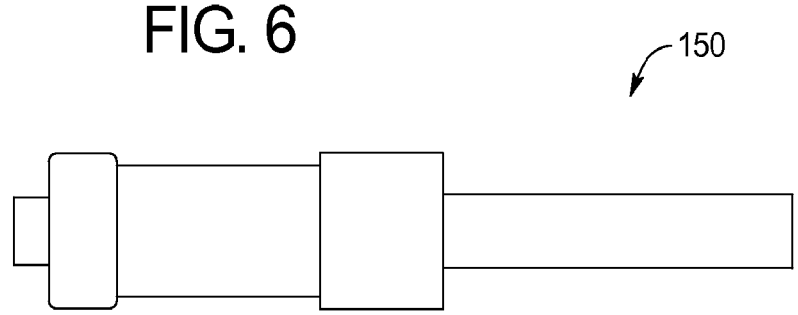
FIG. 6 illustrates a side view of a temperature probe or thermocouple in an embodiment of the present disclosure.

Referring now to FIGS. 4A-4D and FIG. 5, a fitment heater block assembly 100 in an embodiment of the present disclosure is illustrated. Fitment heater block assembly 100 includes a fitment heater block 102 that defines one or more passages 110 for housing one or more heating cartridges (not shown). The heating cartridges can be any suitable heating device that is capable of heating up fitment heater block 100 to a desired temperature. Fitment heater block 102 also comprises one or more passages 120 for housing one or more temperature probes or thermocouples. FIG. 6 illustrates a suitable temperature probe or thermocouple 150.

Figure 4A:
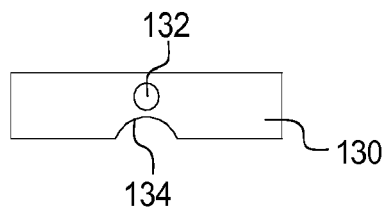
FIG. 4A illustrates a top view of an upper clamping bracket in an embodiment of the present disclosure.
Figure 4B:
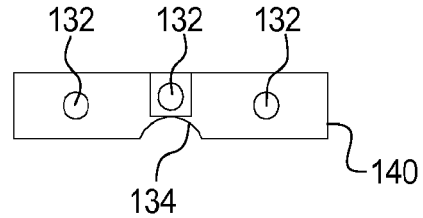
FIG. 4B illustrates a top view of a lower clamping bracket in an embodiment of the present disclosure.
Figure 4C:
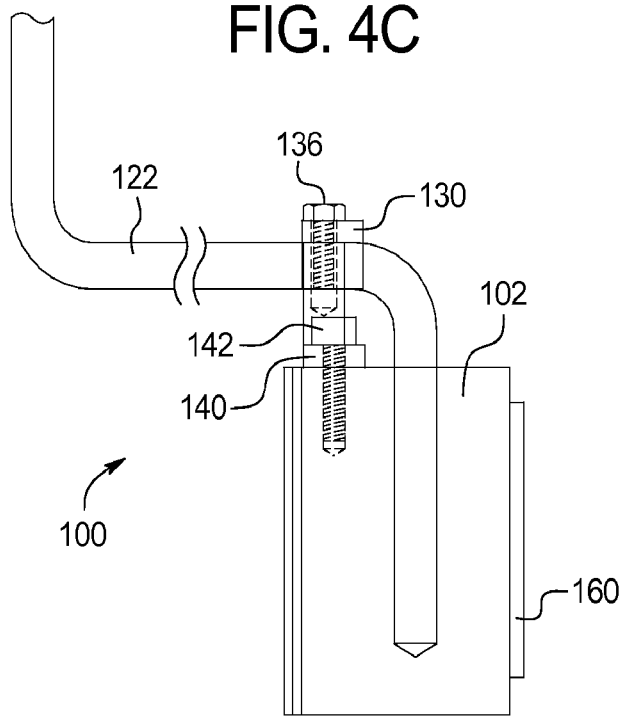
FIG. 4C illustrates a side view of a clamping bracket and fitment heater block assembly in an embodiment of the present disclosure.
Figure 4D:
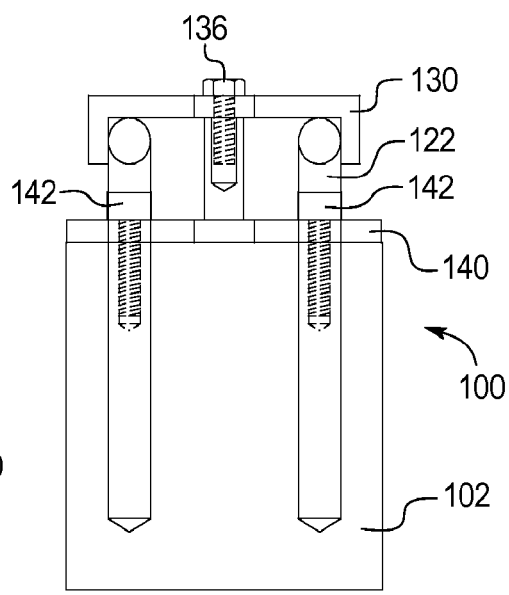
FIG. 4D illustrates a rear view of a clamping bracket and fitment heater block assembly in an embodiment of the present disclosure.

As shown in FIGS. 4C-4D, the one or more temperature probes can be contained within a temperature probe housing 122 to protect the temperature probes. Temperature probe housing 122 can be positioned in place by an upper clamping bracket 130 and a lower clamping bracket 140. Upper clamping bracket 130 can be used to hold the temperature probes or temperature probe housing 122 stationary in conjunction with lower clamping bracket 140.

As seen in FIGS. 4C-4D, lower clamping bracket 130 can be attached to fitment heater block assembly 100 using any suitable fastening mechanisms such as bolts 142. Upper clamping bracket 130 can be positioned over temperature probe housing 122 and attached to fitment heater block assembly 100 using any suitable fastening mechanisms such as a bolt 136. For example, upper clamping bracket 130 and lower clamping bracket 140 can define one or more passages 132 for bolts to attach clamping brackets 130 and 140 securely to fitment heater block assembly 100. upper clamping bracket 130 and lower clamping bracket 140 can also define an arced portion 134 so that the temperature probes can fit besides upper clamping bracket 130 and lower clamping bracket 140 as the temperature probes are positioned in fitment heater block 102.

Failure of thermocouple wiring in conventional fill, form and seal devices typically leads to down time of 6 or more hours. The use of upper clamping bracket 130 and lower clamping bracket 140 in conjunction with fitment heater block 100 and the temperature probes and heating cartridges have been shown to reduce breaking or failure of standard thermocouple wiring in conventional fill, form and seal devices. This saves operating costs and increases operational efficiency of the fill, form and seal devices by reducing the amount of down time spent repairing the thermocouple.

Figure 5:
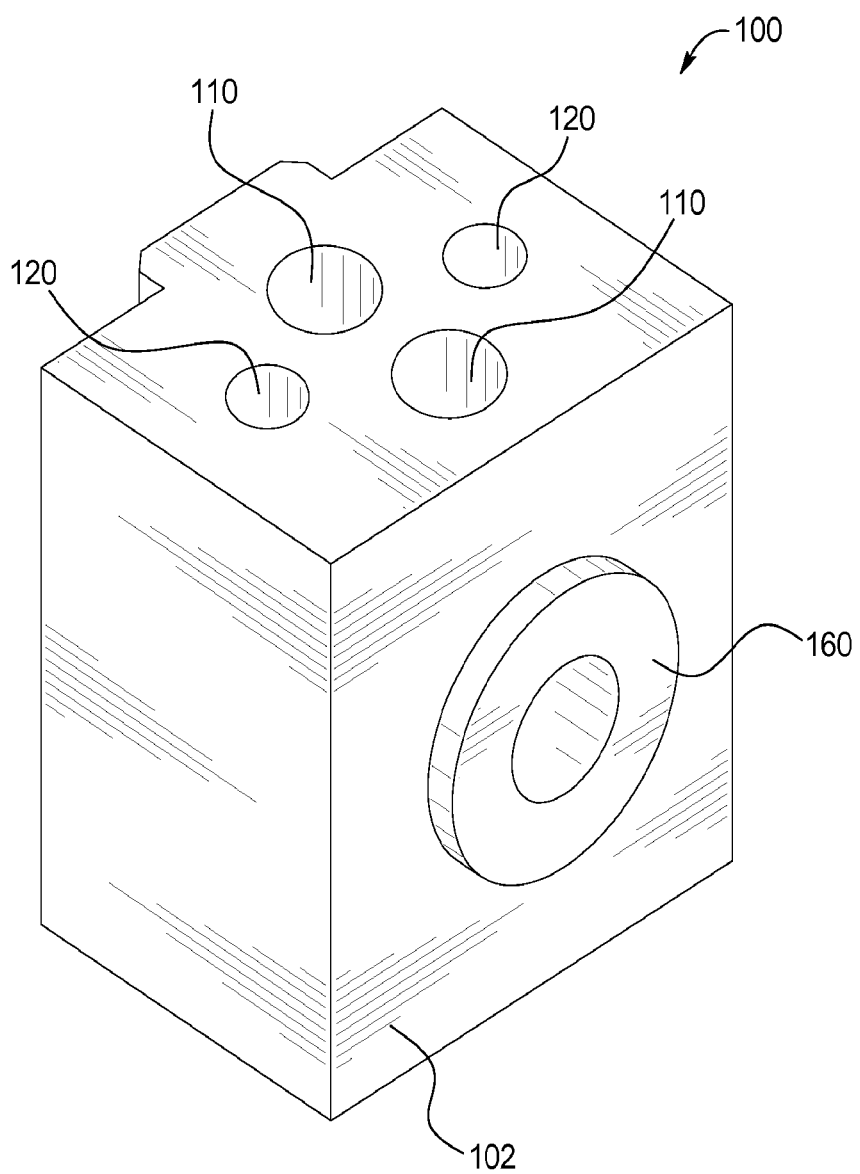
FIG. 5 illustrates a front perspective view of a fitment heater block in an embodiment of the present disclosure.

As shown in more detail in FIG. 5, fitment heater block 102 can include an extended portion 160. Extended portion 160 can be in the shape of ring or a bulls-eye. For example, the center of the ring can be recessed. Extended portion 160 of fitment heater block 102 contacts a side of a film during a fitment placement operation.

Figure 7:
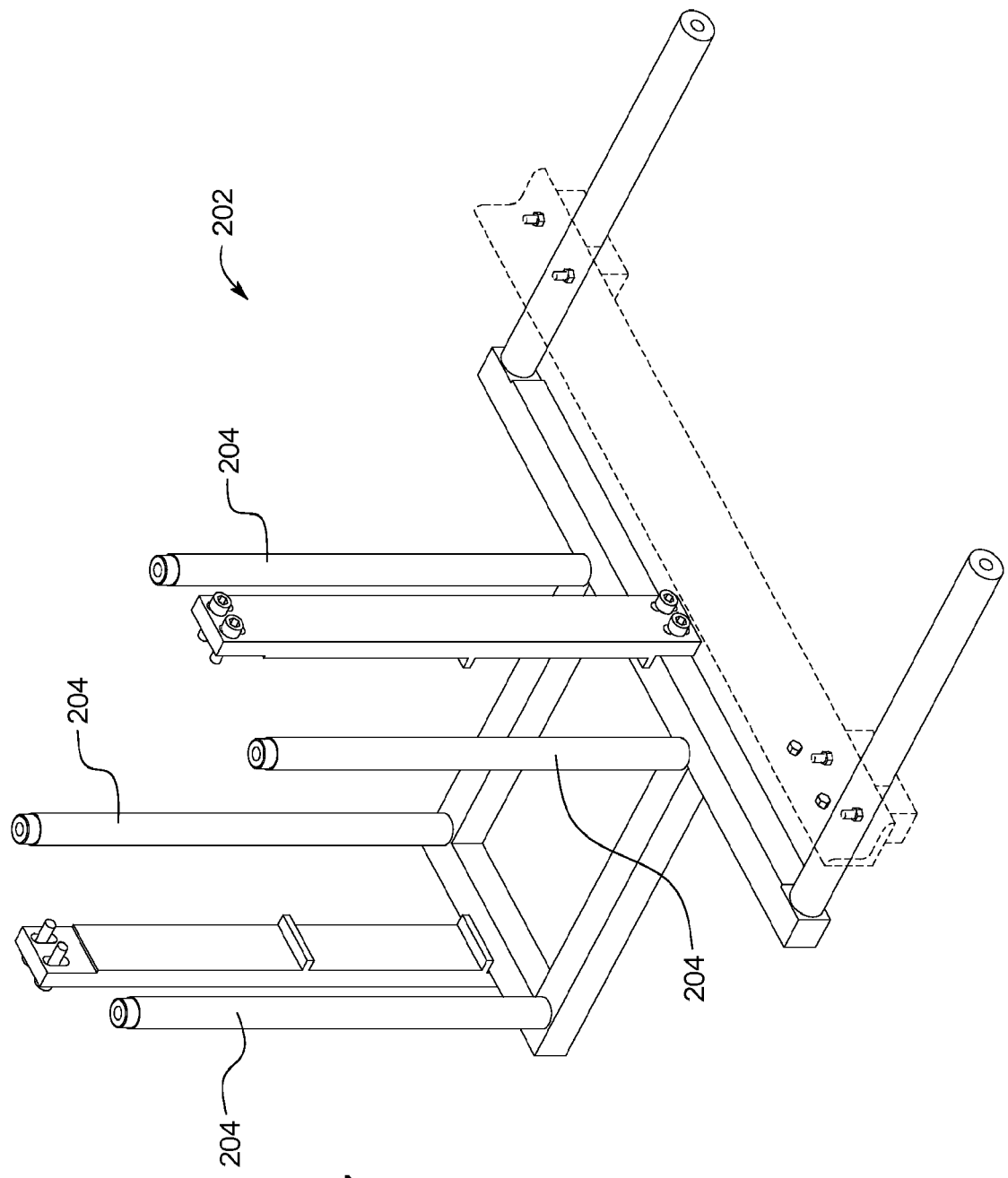
FIG. 7 illustrates a front perspective view of fitment transfer framework in an embodiment of the present disclosure.

FIGS. 7-14 illustrate various components of a fitment transfer assembly. FIG. 7 illustrates a fitment transfer framework or housing 202 for a fitment applicator station 300 shown in FIG. 8 in an embodiment of the present disclosure. Fitment applicator station includes an applicator plate 310 and one or more bushings 312 attached to applicator plate 310. Bushings 312 can be used to so that applicator plate 310 remains firmly and securely attached to fitment transfer framework or housing 202. For example, one or more columns 204 from housing 202 can be positioned through corresponding holes 304 in applicator plate 310 and within bushings 312. Bushings 312 can be attached to applicator plate 310 using any suitable fastening mechanisms such as one or more bolts 350.

An applicator spacer block 314 is used to support a fitment applicator 320 firmly on applicator plate 310. Fitment applicator 320 can be attached to applicator spacer block 314 using any suitable fastening mechanisms such as one or more bolts 340. Fitment applicator 320 includes an applicator head plate 322. Applicator head plate 322 can be attached to fitment applicator 320 by one or more fastening mechanisms such as pins or screws 342.

Figure 8:
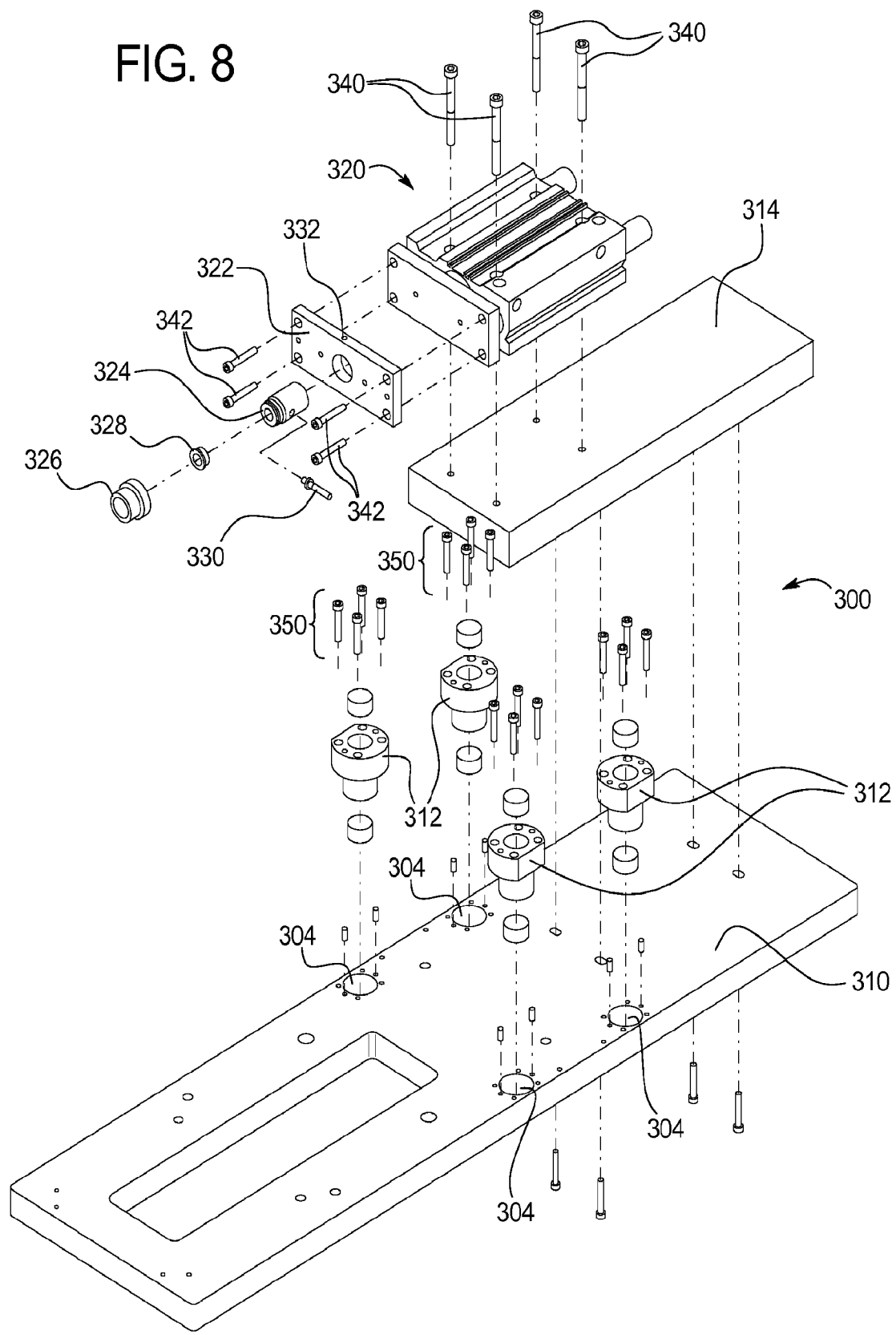
FIG. 8 illustrates an exploded front perspective view of a fitment application station in an embodiment of the present disclosure.
Figure 9:
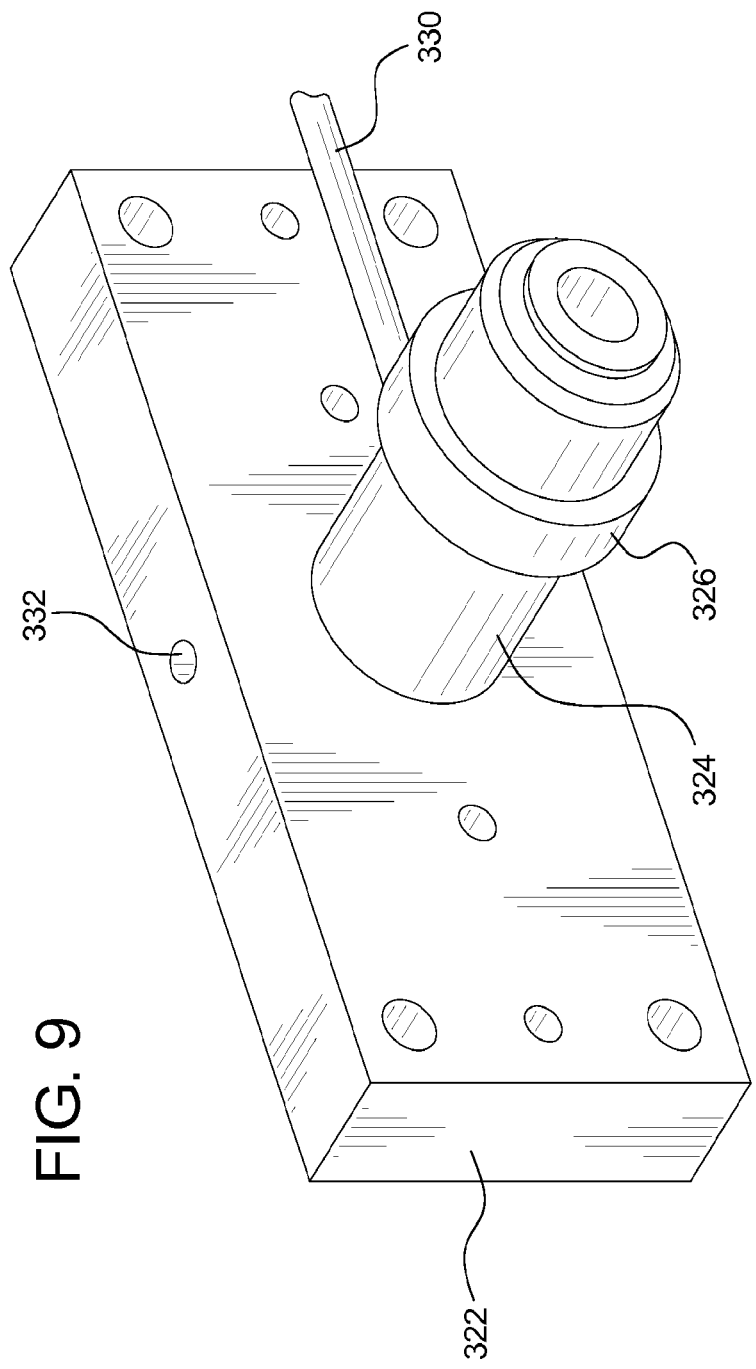
FIG. 9 illustrates a front perspective view of an applicator head plate assembly in an embodiment of the present disclosure.

As further shown in FIGS. 8-9, an applicator head 324 is attached to applicator head plate 322. Applicator head cap 326 is attached to applicator head 324. An applicator head washer 328 can be inserted between applicator head cap 326 and applicator head 320 to provide an air-tight seal.

Applicator head plate 322 can define a passage 332 that can be attached to a vacuum tube that is part of a vacuum assembly (not shown). Applicator head cap 326 can be constructed and arranged to match an end of a fitment that will be suctioned into applicator head 324 via the vacuum assembly. Applicator 324 can further be attached to a fiber optic device 330 that is used to detector whether a fitment is attached to applicator head 324.

Figure 10:
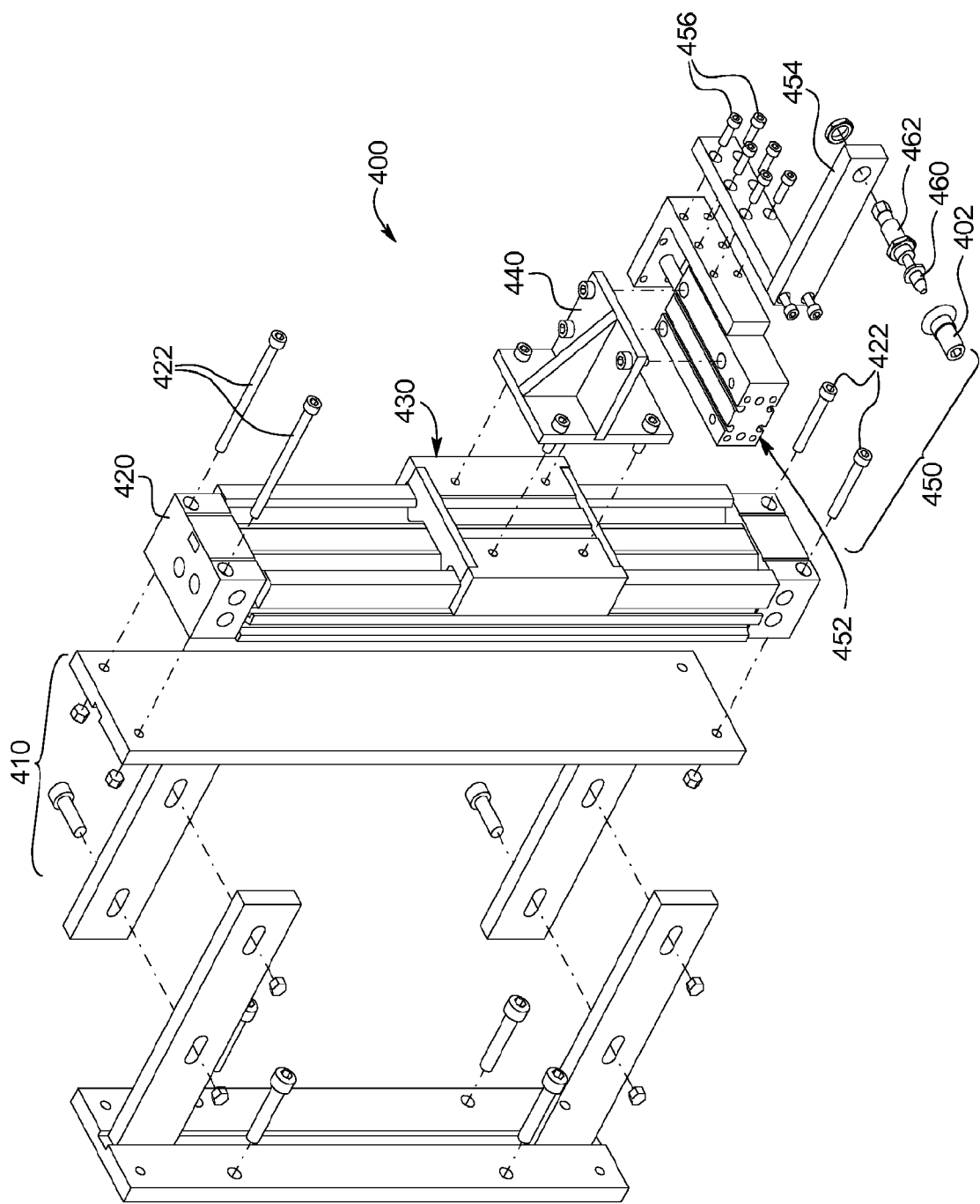
FIG. 10 illustrates an exploded front perspective view of a fitment indexer in an embodiment of the present disclosure.

Referring now to FIG. 10, a fitment indexer 400 in an embodiment of the present disclosure is illustrated. Fitment indexer 400 transports a fitment 402 from an initial fitment holder or storage device to fitment applicator station 300. Fitment indexer includes a vertical positioning stand 410. Vertical positioning stand 410 can have any suitable arrangement to provide a solid and stable structural support for fitment indexer 400.

A horizontal fitment positioning assembly 450 is slidably attached to a vertical guided pneumatic actuator device 420 via a vertical slide assembly 430. Horizontal fitment positioning assembly 450 is constructed and arranged to move the fitment axially in a direction that is perpendicular to the movement of vertical slide assembly 430.

Vertical guided pneumatic actuator device 420 is attached to vertical positioning stand 410. Vertical guided pneumatic actuator device 420 can be attached to vertical positioning stand 410 using any suitable fastening mechanisms such as one or more bolts or pins 422. Vertical sliding assembly 430 comprises a base or mount that is slidably attached to vertical guided pneumatic actuator device 420. Vertical sliding assembly 430 is constructed and arranged to move horizontal fitment positioning assembly 450 up and down along vertical guided pneumatic actuator device 420 via any suitable mechanism such as, for example, a rodless pneumatic cylinder or actuator.

Figure 12A:
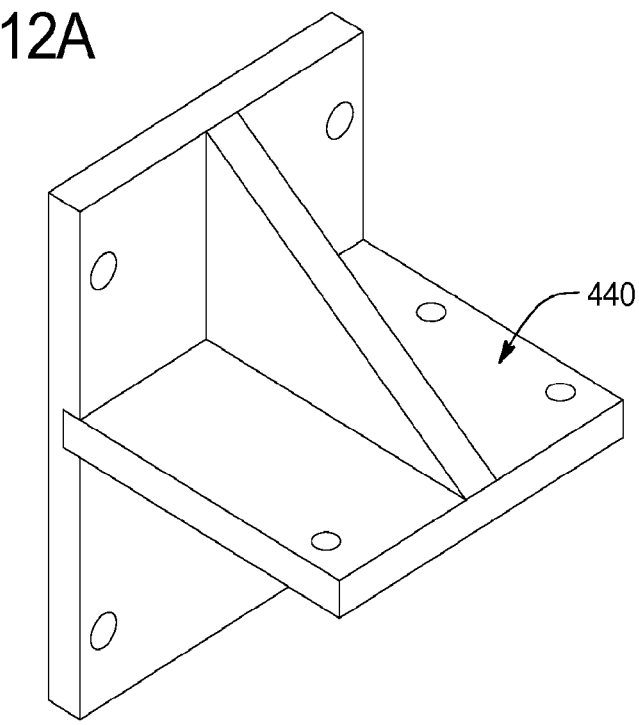
FIG. 12A illustrates a front perspective view of an attachment support in an embodiment of the present disclosure.
Figure 12B:
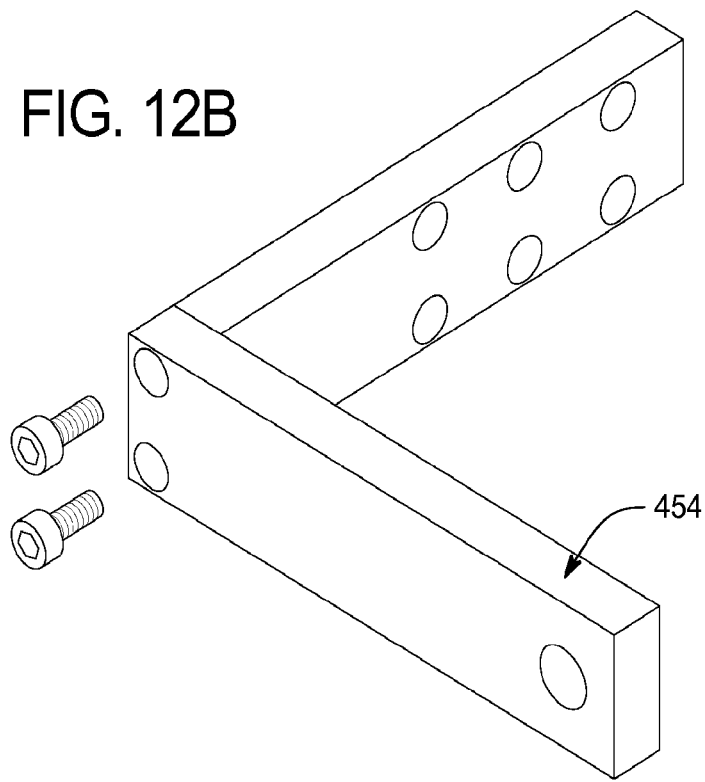
FIG. 12B illustrates a front perspective view of a bracket in an embodiment of the present disclosure.

Horizontal fitment positioning assembly 450 can be attached to vertical sliding assembly 430 via an attachment support 440 (see FIG. 12A). Horizontal fitment positioning assembly 450 includes a guided pneumatic actuator assembly 452 attached to attachment support 440. A bracket 454 (see FIG. 12B) is attached to guided pneumatic actuator assembly 452 that moves via a pneumatic cylinder or actuator. Bracket 454 is attached to guided pneumatic actuator assembly 452 using any suitable fastening mechanisms such as one or more bolts or pins 456. A vacuum nozzle 462 is attached to an end of bracket 454.

Figure 11:
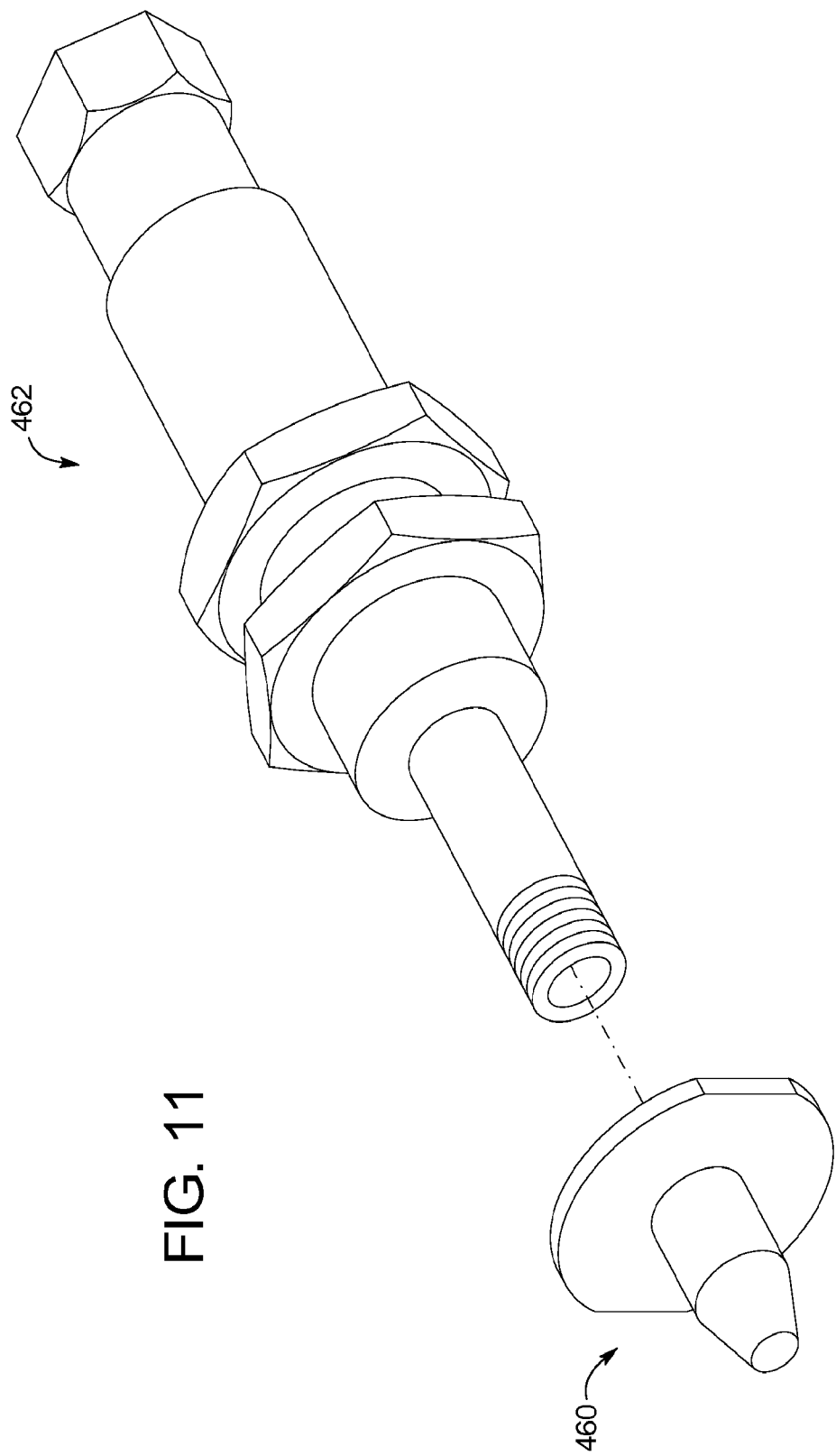
FIG. 11 illustrates a front perspective view of a pick-up pin nipple and a vacuum nozzle assembly in an embodiment of the present disclosure.

As shown in FIGS. 10-11, a pick-up pin nipple 460 is attached to vacuum nozzle 462. Vacuum nozzle 462 is constructed and arranged to provide a vacuum through pick-up pin nipple 460. Pick-up pin nipple 460 in conjunction with vacuum nozzle 462 to pick up and hold fitment 402 onto the end of pick-up pin nipple 460 as fitment 402 is transported all the way from the fitment storage location to fitment applicator station 300.

As previously discussed, any suitable mounting assembly can be used to hold fitment indexer 400 in place including vertical positioning stand 410. The mounting assembly can include any suitable configuration for providing a secure foundation for fitment indexers in embodiments of the present disclosure.

Figure 13:
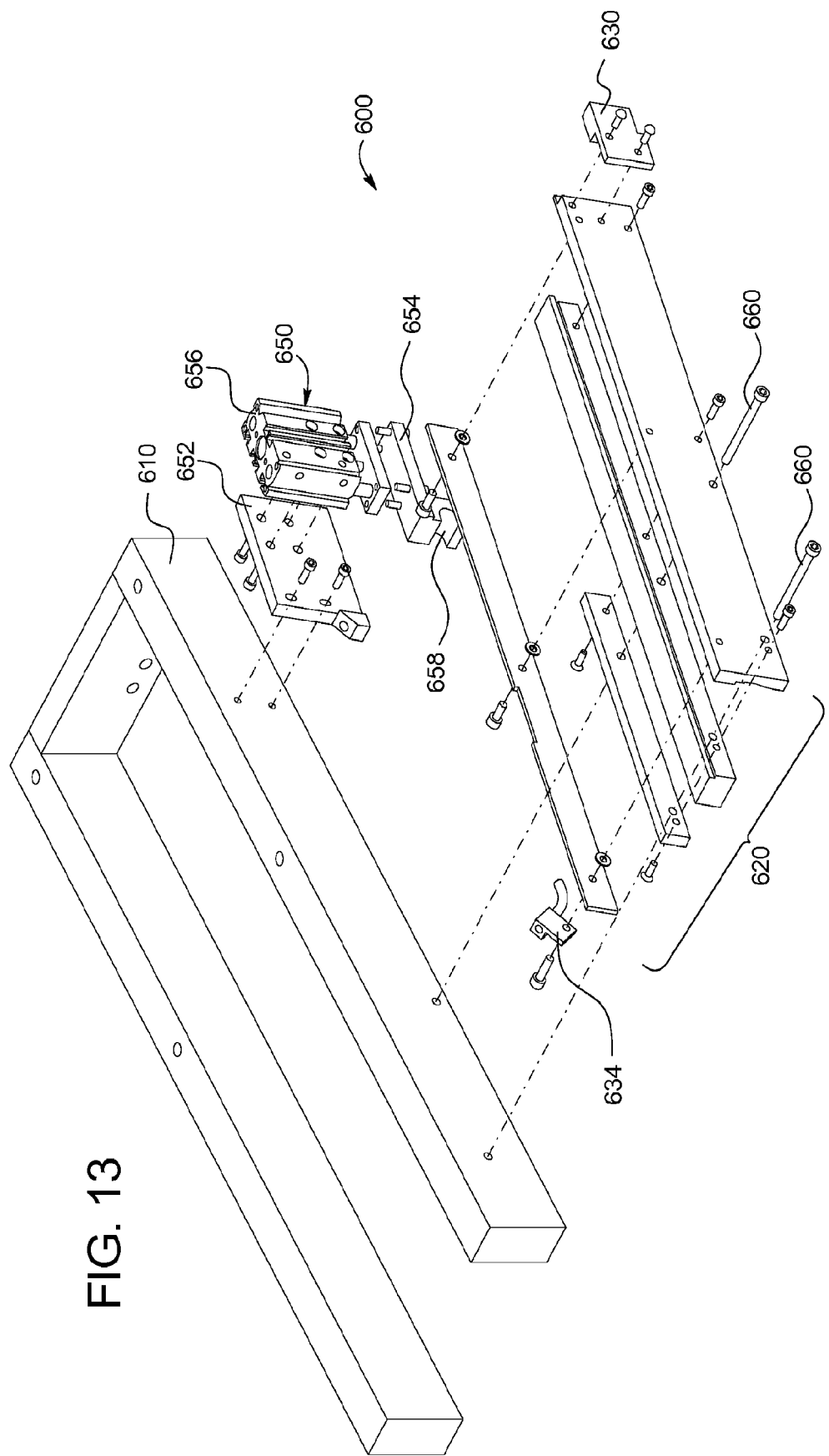
FIG. 13 illustrates an exploded front perspective view of a feed conveyor system and indexing device in an embodiment of the present disclosure.
Figure 14:
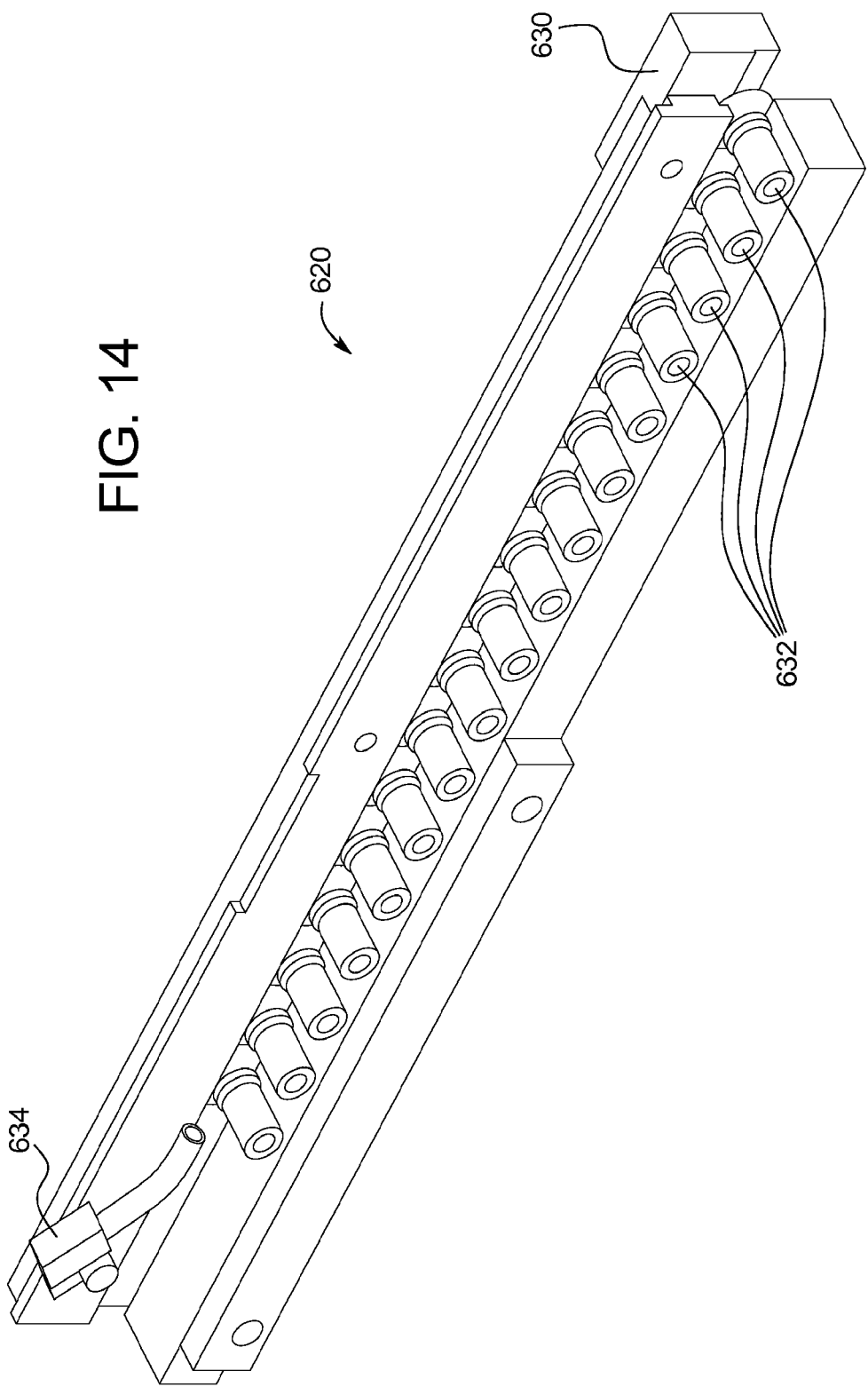
FIG. 14 illustrates a front perspective view of a fitment rail assembly detail in another embodiment of the present disclosure.

Referring now to FIGS. 13-14, a feed conveyor system 600 (e.g., vibratory) in an embodiment of the present disclosure is illustrated. Feed conveyor system 600 includes a support frame 610. A fitment rail assembly 620 is attached to support frame 610 using any suitable fastening mechanisms such as one or more bolts or pins 660. Fitment rail assembly 620 can be made of a first elongated rail 622, a second elongated rail 624, a third elongated rail 626, a fourth elongated rail 628 and a rail end guide 630 that are constructed and arranged to hold one or more fitments 632, for example, in a row along the length of fitment rail assembly as shown in FIG. 14.

Feed conveyor system 600 also includes a fitment indexing module 650 attached to support frame 610. Fitment indexing module 650 can be attached to support frame 610 via a guided pneumatic actuator mounting plate 652. Fitment indexing module 650 is also attached to an end of fitment rail assembly 620 at or near rail end guide 630.

Fitment indexing module 650 includes an actuator plate 654 defining a curved portion 658 for partially housing a fitment. Fitment indexing module 650 includes a pneumatic actuator 656 that is constructed and arranged to move actuator plate 654 up and down or towards and away from fitment indexing module 650. In this regard, fitment indexing module 650 enables a fitment to be exposed to and picked up by pick-up pin nipple 460 and vacuum nozzle 462 of fitment indexer 400.

In an embodiment, fitment rail assembly 620 is constructed and arranged at an angle from support frame 610 in a manner that allows the series of fitments 632 contained within fitment rail assembly 620 to move by gravity from the end that is attached to support frame 610 towards the end having rail end guide 630. In another embodiment, fitment rail assembly 620 comprises an air or gas outlet 634 that expels air into fitments 632 to assist in pushing fitments 632 toward rail end guide 630.

During operation, pneumatic actuator 656 moves actuator plate 654 up so that curved portion 658 is directly in the pathway of the series of fitments 632. One fitment slides into curved portion 658. Pneumatic actuator 656 then moves actuator plate down 654 so that fitment 632 aligns with pick-up pin nipple 460 of fitment indexer 400. Fitment indexer 400 then transports fitment 632 to fitment applicator station 300 where it can be placed onto a container.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A fitment heater assembly comprising:
a fitment heater block;
at least one temperature probe; and
a clamp configured and arranged to secure the at least one temperature probe onto the fitment heater block, and the fitment heater block comprises a substantially continuous face defining one or more passages for housing the at least one temperature probe,
wherein the clamp comprises an upper clamping bracket and a lower clamping bracket that position a temperature probe housing that contains the at least one temperature probe, and the lower clamping bracket is attached to the fitment heater block.

2. The fitment heater assembly of claim 1, wherein the fitment heater block comprises at least one heating cartridge.

3. The fitment heater assembly of claim 1, wherein the fitment heat block comprises an extended portion having a bulls-eye shape, and wherein the extended portion protrudes from the fitment heater block.

4. A system comprising a fitment applicator station and the fitment heater assembly according to claim 1, the fitment applicator station comprising:
an applicator plate having at least one bushing;
an applicator spacer block attached to the applicator plate;
a fitment applicator attached to the applicator spacer block; and
a housing comprising at least one column positioned through a corresponding hole and within a corresponding bushing,
wherein the fitment applicator is configured to press a fitment into a film placed between the fitment applicator station and the fitment heater assembly and into the fitment heater block.

5. The system of claim 4, wherein the fitment applicator comprises an applicator head plate, an applicator head attached to the applicator head plate, and an applicator head cap attached to the applicator head.

6. The system of claim 5, wherein a vacuum tube is attached to the applicator head plate.

7. The system of claim 5, wherein a fiber optic device is attached to the applicator head.

8. A system comprising a fitment applicator and the fitment heater assembly according to claim 1, the fitment applicator comprising:
an applicator head plate;
an applicator head attached to the applicator head plate; and
an applicator head cap attached to the applicator head, and a vacuum tube attached to the applicator head plate,
wherein the fitment applicator is configured to press a fitment into a film placed between the fitment applicator and the fitment heater assembly and into the fitment heater block.

9. The system of claim 8, wherein a fiber optic device is attached to the applicator head.

* * * * *